US007889379B2

United States Patent
Okayama et al.

(10) Patent No.: US 7,889,379 B2
(45) Date of Patent: Feb. 15, 2011

(54) IMAGE PROCESSING APPARATUS USING PATH MANAGEMENT AND CONTROL METHOD OF THE SAME

(75) Inventors: Noritsugu Okayama, Kawasaki (JP); Fumio Shoji, Tokyo (JP); Takao Ikuno, Yokohama (JP); Masahiro Odaira, Kawasaki (JP); Yoshiaki Katahira, Yokohama (JP); Toru Fujino, Kawaguchi (JP); Kenji Kasuya, Yokohama (JP); Yasuhito Niikura, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1007 days.

(21) Appl. No.: 11/571,719

(22) PCT Filed: Jun. 23, 2005

(86) PCT No.: PCT/JP2005/012017
§ 371 (c)(1), (2), (4) Date: Jan. 5, 2007

(87) PCT Pub. No.: WO2006/006409
PCT Pub. Date: Jan. 19, 2006

(65) Prior Publication Data
US 2008/0049267 A1  Feb. 28, 2008

(30) Foreign Application Priority Data
Jul. 12, 2004  (JP)  ............................... 2004-205062

(51) Int. Cl.
G06F 3/12 (2006.01)
G06K 15/00 (2006.01)
(52) U.S. Cl. ..................................... 358/1.16; 358/1.15
(58) Field of Classification Search ................ 358/1.15, 358/1.16
See application file for complete search history.

(56) References Cited

U.S. PATENT DOCUMENTS

| 7,688,460 | B2 * | 3/2010 | Takagi et al. ................ 358/1.15 |
| 2003/0046058 | A1 * | 3/2003 | Stuckler et al. ................ 704/7 |
| 2003/0115552 | A1 * | 6/2003 | Jahnke et al. ............... 715/536 |
| 2003/0140316 | A1 * | 7/2003 | Lakritz ....................... 715/536 |
| 2003/0182632 | A1 * | 9/2003 | Murdock et al. ............ 715/536 |
| 2004/0227968 | A1 * | 11/2004 | Nakamura et al. ......... 358/1.13 |
| 2004/0237044 | A1 * | 11/2004 | Travieso et al. ............. 715/530 |

FOREIGN PATENT DOCUMENTS

| JP | 11-296468 | 10/1999 |
| JP | 2000-165587 | 6/2000 |
| JP | 2002-111706 | 4/2002 |

* cited by examiner

*Primary Examiner*—Twyler L Haskins
*Assistant Examiner*—Fred Guillermety
(74) *Attorney, Agent, or Firm*—Fitzpatrick, Cella, Harper & Scinto

(57) ABSTRACT

Disclosed is an image processing apparatus which prevents repetitive storage of identical image data, and efficiently uses a storage area. More specifically, a facsimile apparatus (8) has a network interface, and also has a display unit (4c) as a display means for displaying an image as a user interface, a main controller (3) including a memory as a storage means for storing image data, a display controller (4b) as a generating means for generating an image to be displayed on the display means, by using the image data stored in the memory, and an HTTP server as a transmitting means for transmitting the image data stored in the memory, in response to a browsing request input via the network interface.

9 Claims, 7 Drawing Sheets

| IMAGE ID | PATH TO IMAGE FILE (JAPANESE) | ADDRESS ON MEMORY |
|---|---|---|
| 1001 | "title_jpn.gif" | 0x1010000 |
| 1002 | "telmark_jpn.gif" | 0x1020000 |
| 1003 | "device_wld.gif" | 0x1030000 |
| 1004 | " " | 0x1040000 |
| ⋮ | ⋮ | ⋮ |
| 1999 | " " | 0x11FFF0 |

402

| IMAGE ID | PATH TO IMAGE FILE (ENGLISH) | ADDRESS ON MEMORY |
|---|---|---|
| 1001 | "title_eng.gif" | 0x1110000 |
| 1002 | "telmark_eng.gif" | 0x1120000 |
| 1003 | "device_wld.gif" | 0x1130000 |
| 1004 | " " | 0x1140000 |
| ⋮ | ⋮ | ⋮ |
| 1999 | " " | 0x11FFF0 |

IMAGE PROCESSING APPARATUS USING PATH MANAGEMENT AND CONTROL METHOD OF THE SAME

TECHNICAL FIELD

The present invention relates to an image processing apparatus including a network interface, and a control method of the same.

BACKGROUND ART

Recently, as one type of image processing apparatuses, apparatuses including a network interface and having a function of transmitting display data in response to a browsing request from a terminal on a network exist. Of these image processing apparatuses, an apparatus including a display means such as a liquid crystal display is known, and this apparatus further includes a function of generating an image to be displayed on the display means (Japanese Patent Laid-Open No. 11-296468).

Display data to be transmitted across the network and display data to be displayed on the display means of the apparatus often include exactly the same image.

It is necessary to increase the capacity of a storage medium such as a ROM for storing image data, and this increases the cost.

The above conventional image processing apparatus, however, separately stores the display data to be transmitted across the network and the display data to be displayed on the display means.

Accordingly, identical image data are repetitively stored, so the storage capacity for storing the image data excessively increases. This increases the capacity of a storage medium such as a ROM incorporated into the apparatus, and decreases the productivity of the apparatus itself.

In addition, mismatching in expression sometimes occurs between an image displayed on an operation unit of the main apparatus and an image displayed by a browser.

DISCLOSURE OF INVENTION

The present invention enable to provide an image processing apparatus capable of avoiding repetitive storage of image data, and efficiently using the storage area.

One aspect of the present invention is an image processing apparatus having a network interface, characterized by comprising, display means for displaying an image as a user interface, storage means for storing image data, generating means for generating display data to be displayed on the display means, by using the image data stored in the storage means, and transmitting means for transmitting the image data stored in the storage means to another terminal, in response to a browsing request input from the another terminal via the network interface, wherein in order to read out the same image from the generating means and transmitting means, the storage means stores, for one image data, a pair of a path by which the transmitting means designates the image data and an address by which the generating means designates the image data.

Other features and advantages of the present invention will be apparent form the following description taken in conjunction with the accompanying drawings, in which like reference characters designate the same or similar parts throughout the figures thereof.

BRIEF DESCRIPTION OF DRAWINGS

FIG. 4 is a view showing correspondence tables included in the facsimile apparatus as the embodiment of the present invention;

BEST MODE FOR CARRYING OUT THE INVENTION

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

(Arrangements)

Figure 1:
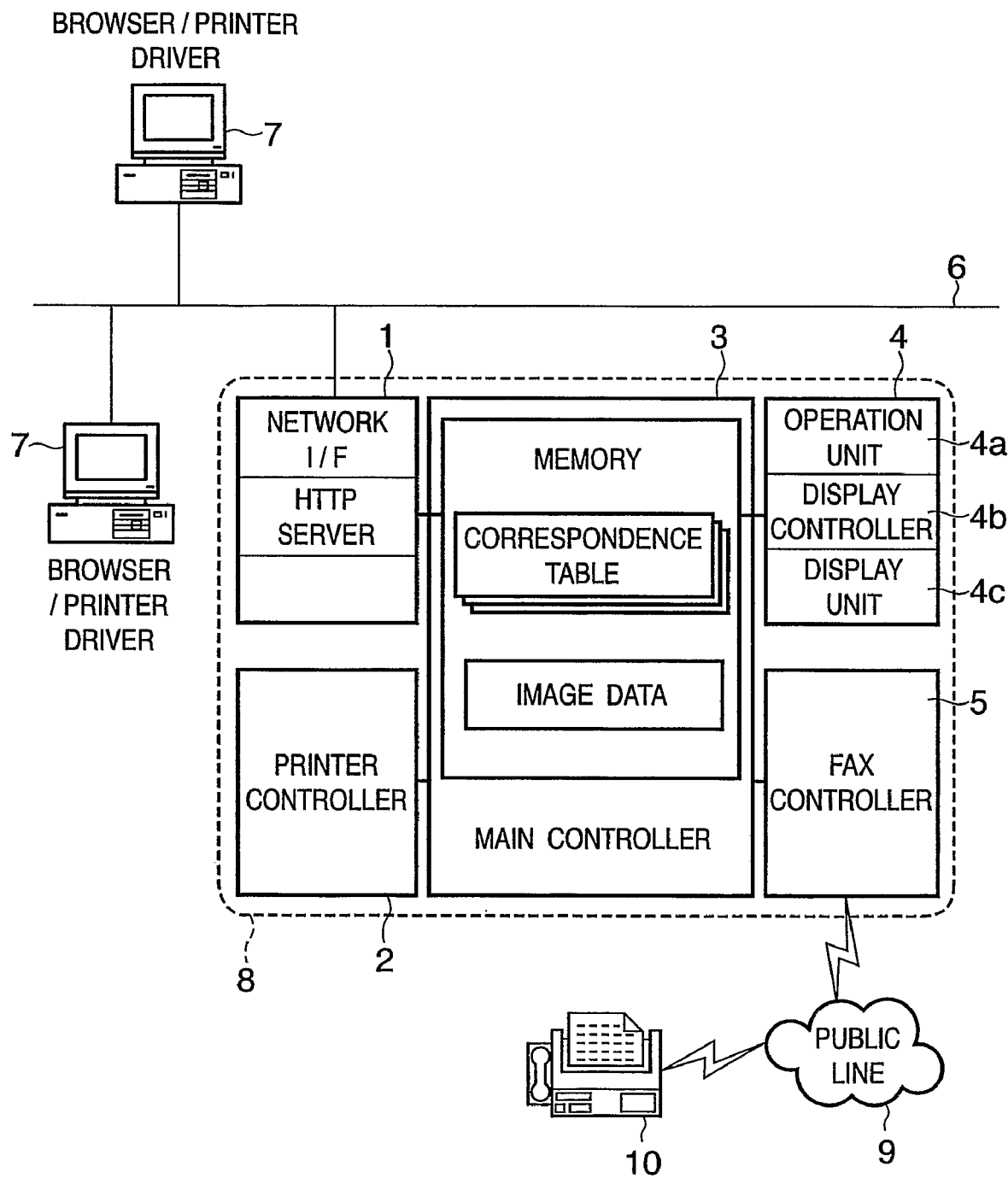
FIG. 1 is a schematic view for explaining the internal arrangement of a facsimile apparatus as an embodiment of the present invention and the peripheral environment of the facsimile apparatus.

FIG. 1 is a view for explaining the internal arrangement of a facsimile apparatus 8 as an embodiment of the present invention, and a peripheral environment to which the facsimile apparatus 8 is applicable.

The facsimile apparatus 8 roughly comprises a NIC (Network Interface Card) 1 including a network interface and HTTP server, printer controller 2, main controller 3, operation panel 4, and FAX controller 5. The FAX controller 5 connects to a public line 9, and can communicate with another facsimile-apparatus 10 or the like by a facsimile protocol. The operation panel 4 includes an operation unit 4a including buttons and the like, a display unit 4c which is a liquid crystal display, and a display controller 4b which controls display on the display unit 4c.

Also, in FIG. 1, the facsimile apparatus 8 is connected to a network 6 such as a LAN. A plurality of terminals 7 such as PCs for remote operations can be connected to the network 6, and a user can perform remote operations by designating the network address of the facsimile apparatus 8 as an HTTP server, and accessing the address from browser software running on the terminal 7.

The user can also control the facsimile apparatus 8 by operating the operation unit 4a while viewing images displayed on the display unit 4c.

(Operations)

Figure 2:
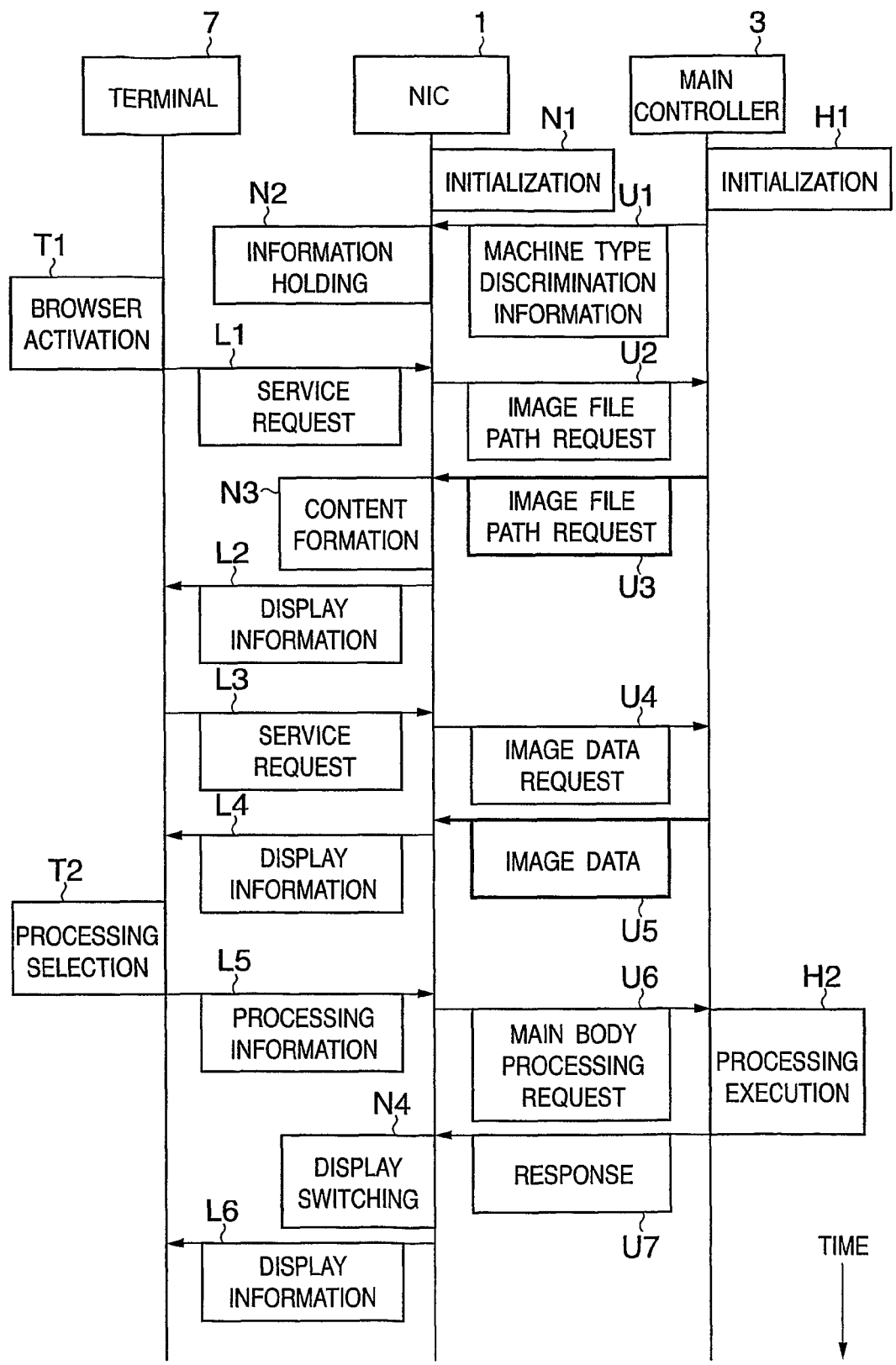
FIG. 2 is a sequence diagram for explaining the flows of processing between an NIC and main controller included in the facsimile apparatus as the embodiment of the present invention, and a terminal connected across a network to the facsimile apparatus.

FIG. 2 expresses, in a time series manner, the operations of the terminal 7, NIC 1, and main controller 3, and the flows of information between them.

When the power supply of the main body is turned on, the NIC 1 and main controller 3 perform initialization synchronously (N1/H1). After that, the main controller 3 transfers information necessary for discrimination of the machine type to the NIC 1 (U1). The NIC 1 stores the information, and prepares for content formation corresponding to the machine type (N2).

When the user of the terminal 7 activates the browser and designates the address of the NIC 1 (T1), a service request arrives at the NIC 1 across the LAN (L1). The NIC 1 requests the main controller 3 for information, such as an external appearance view of the product and facsimile transmission/reception result information, necessary to generate contents, and image data (U2). In response to this request, the main controller 3 transfers predetermined information and image data to the NIC 1 (U3). The NIC 1 generates contents on the basis of these pieces of information (N3). More specifically, the NIC 1 forms an HTML file by, e.g., calling a CGI (Common Gateway Interface), and embedding SSI (Server Side Include) and the received image data.

After that, the NIC 1 returns, as a response of the service, HTML file information to be displayed on the browser of the terminal 7 (L2), so the user can browse the information related to the facsimile apparatus 8 on the browser of the terminal 7. If the image displayed on the browser of the terminal 7 is to designate loading of image data, a tag of an image file is embedded in the HTML file. Therefore, if loading of an image is designated from the browser on the basis of a user's operation, a request for this image file is generated from the terminal 7 to the NIC in accordance with the designation (L3). The main controller searches for the data address of the requested image file, and returns the address to the NIC (U4)(U5). The NIC sends the image data to the browser (L4).

Also, when the user wants to perform an operation such as rewrite of information in the facsimile apparatus 8, selection of a display language, or stoppage of processing currently being executed, he or she selects processing on the browser in accordance with the contents (T2). When the information has arrived at the NIC 1 via the LAN (L5), the NIC 1 executes predetermined processing by using the CGI or SSI, and issues an operation request to the main controller 3 (U6). If the requested processing is successfully performed in the main controller 3 (H2), a response is returned (U7), and the NIC 1 switches images to be displayed in accordance with the response (N4), and returns display information (L6). The terminal 7 displays a new image on the browser on the basis of the received display information.

By repeating the same processing after that, it is possible to continuously perform display of the main apparatus information and a remote operation of the apparatus.

Figure 3:
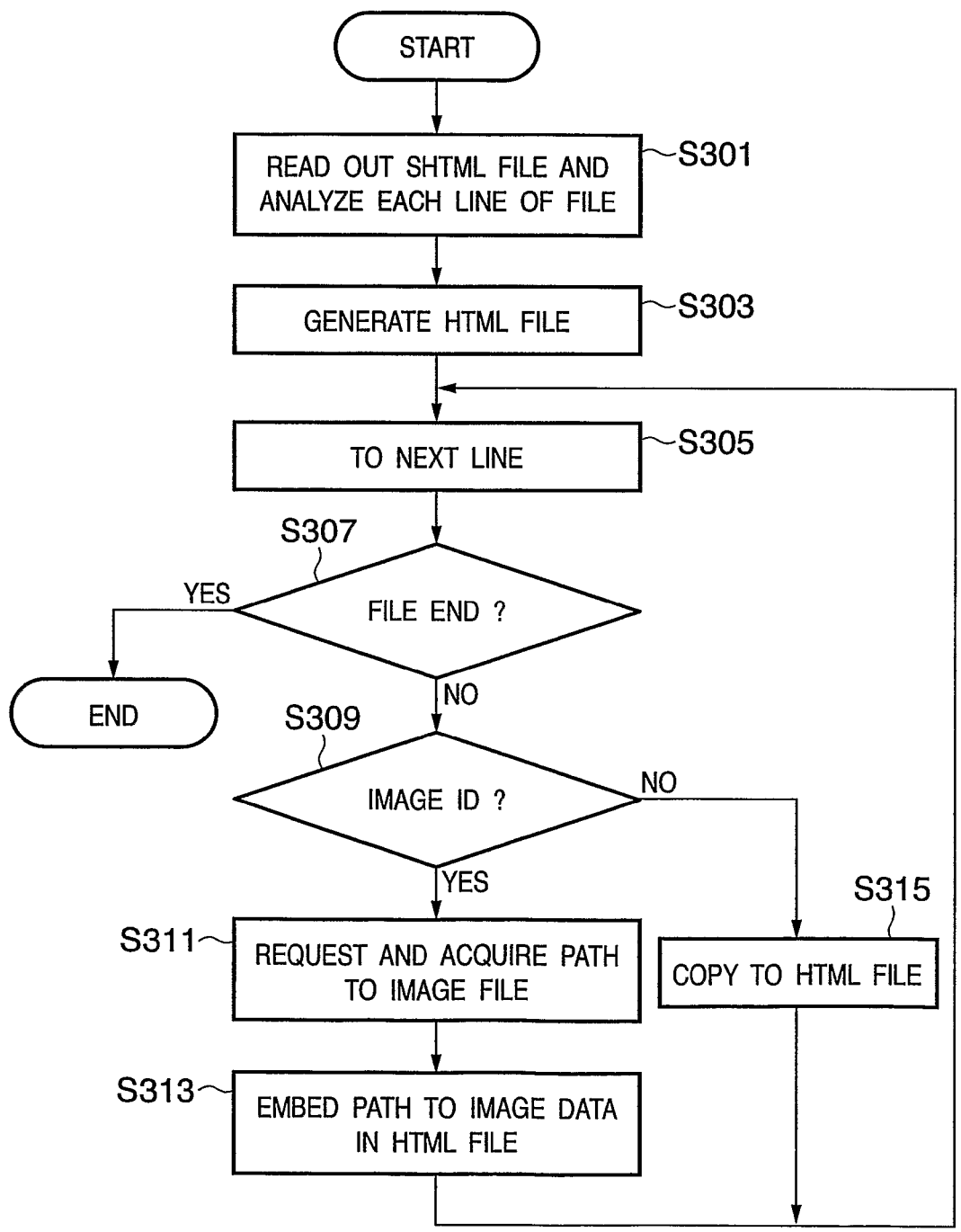
FIG. 3 is a flowchart showing a content formation process performed by an HTTP server included in the facsimile apparatus as the embodiment of the present invention.

FIG. 3 is a flowchart showing the flow of the content formation process indicated by N3 in FIG. 2.

The NIC 1 responds to a service request from the terminal 7 (L1), reads out an SHTML file as a basis from the HTTP server, and analyzes each line of the file (S301). The SHTML file prestored in the HTTP server contains no image data file name, and all pieces of information concerning an image are described in the form of an image ID independent of a language.

A CGI program for generating an empty (body) HTML file is embedded in the header of the SHTML file, and an empty HTML file is generated by executing this CGI program (S303).

Then, the flow advances to step S305 to analyze the next line. In step S307, whether a file end is described in the line being analyzed is determined, and, if a file end is found, the analysis is immediately terminated.

If no file end is found in the line being analyzed, the flow advances to step S309 to determine whether an image ID is embedded. If an image ID is embedded in the line being analyzed, the flow advances to step S311, and the image ID and a requested language setting value are transferred to the main controller 3 to request an image file path. In response to this request, the main controller 3 transfers the image file path to the HTTP server. The HTTP server acquires this path, and embeds it in a predetermined position of the HTML file generated in step S303 (S313). For example, if an image ID 1003 is described in the SHTML file and the requested language is English, "device_wild.gif" is copied as a path to the image file to the HTML file.

On the other hand, if it is determined in step S309 that there is no image ID in the line being analyzed, the description of the SHTML file is directly copied to the HTML file (S315).

The HTML file is dynamically formed by thus reading the SHTML file to the file end (S307). The dynamically formed HTML file is returned in (L2).

Note that when a browser is installed in the facsimile apparatus 8 and an image is to be displayed on the display unit 4c, an HTML file can be generated from an SHTML file and analyzed by the browser of the apparatus in the same manner as the processing shown in FIG. 3.

Normally, in an apparatus incorporating a file system, a table showing the correspondence of image IDs with image file paths is prepared in the main controller 3, and an HTML file in which an image file path is embedded is transmitted once. If an image file designating a path is requested from a browser of a terminal after that, the image file is specified from the path by using the file system, read out, and transmitted to the terminal.

Unfortunately, in an apparatus such as an inexpensive facsimile apparatus having no file system, even when a path is designated from a terminal, a memory cannot be accessed by using the path.

In this embodiment, therefore, predetermined image data is transmitted in response to a request from a terminal on a network by using a table showing the correspondence of dummy paths with physical addresses on a memory as will be described below.

FIG. 4 is a view showing correspondence tables 401 and 402 stored on a memory space in the main controller 3. The correspondence tables 401 and 402 are tables in which image IDs, dummy paths to image files, and the physical addresses of image data are made to correspond to each other. Note that in FIG. 4, only the first physical address is stored because the storage capacity of one unit of image data is constant. However, the present invention is not limited to this embodiment, and the range of a physical address to be read out may also be stored. Each path registered in FIG. 4 is a dummy path defined solely to be embedded in the HTML file in step S313 of FIG. 3. Since the facsimile apparatus 8 according to this embodiment has no file system as described above, no image data is stored on the memory as an image file which can be specified by a path, so a dummy path need be converted into a physical address by using the table shown in FIG. 4. Note that an extension included in this dummy path must correspond to the compression form of image data stored in the memory, but portions except for this extension can be freely defined as long as the image data can be distinguished from other image data.

The correspondence table 401 is a table showing the correspondence of a physical address in which image data containing a Japanese character string is stored, an image ID, and a dummy path, and the correspondence table 402 is a table showing the correspondence of a physical address in which image data containing an English character string is stored, an image ID, and a dummy path. All these tables corresponding to a plurality of languages are arranged on a common memory space.

By looking up these correspondence tables, the main controller 3 can derive a physical address on the memory in which desired image data is stored and a dummy path, on the basis of an image ID and language setting value. Note that image data stored in physical addresses corresponding to the same image ID represent the same contents regardless of languages.

Although the correspondence table 401 for Japanese and the correspondence table 402 for English are shown in this embodiment, the present invention is not limited to these, and it is also possible to store the correspondence of image data represented by other languages (e.g., Chinese, Korean, French, Italian, and German) to image IDs. These correspondence tables are desirably arranged on a common memory space in this case as well.

Figure 5:
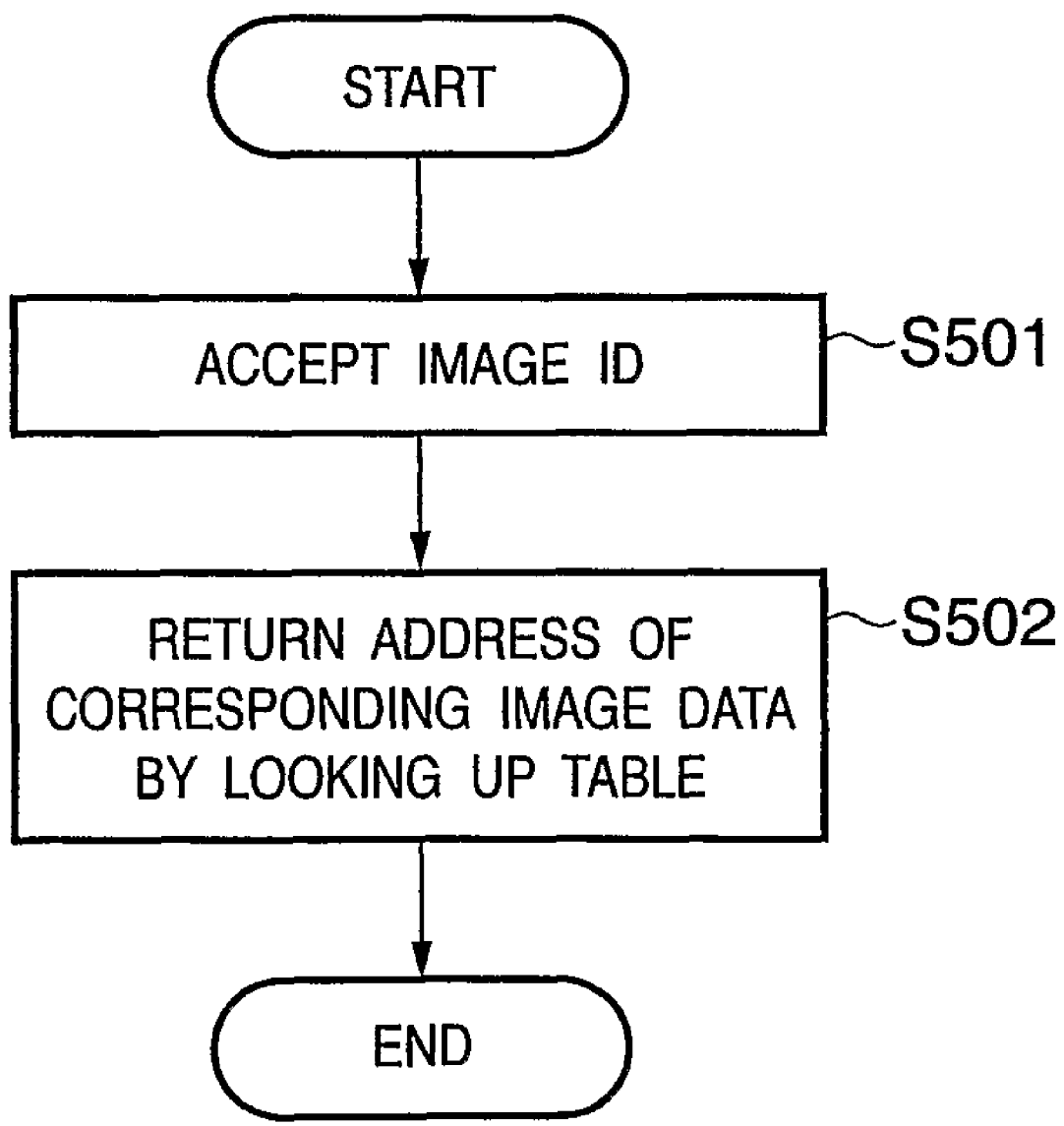
FIG. 5 is a flowchart showing processing performed in response to an image data request by the main controller included in the facsimile apparatus as the embodiment of the present invention.

FIG. 5 is a flowchart showing the flow of processing which the main controller 3 performs when receiving an image data request from the display controller 4b.

When a desired image is to be displayed on the display unit 4c in accordance with a user's operation on the operation unit 4a, the display controller 4b of the main body requests the main controller 3 for image data by designating an image ID.

When accepting the image ID from the display controller 4b of the main body (S501), the main controller 3 looks up the correspondence tables shown in FIG. 4, and returns a physical address on the memory in which the requested image data is stored, on the basis of the accepted image ID and a language setting value (a value which defines a language to be used to display an image) preset as registered data of the apparatus by the user (S502). For example, if the language setting value is Japanese and the image ID is 1001, an address 0x1010000 is obtained. The display controller 4b accesses the memory on the basis of the returned address, and reads out the desired image data.

Note that the language setting value set as registered data of the apparatus can be changed within a range predetermined in the apparatus by a user's operation on the operation unit 4a. For example, it is only necessary to display a selection menu for selecting English or Japanese on the display unit 4c, and set the language setting value as registered data in accordance with user's selection.

Figure 6:
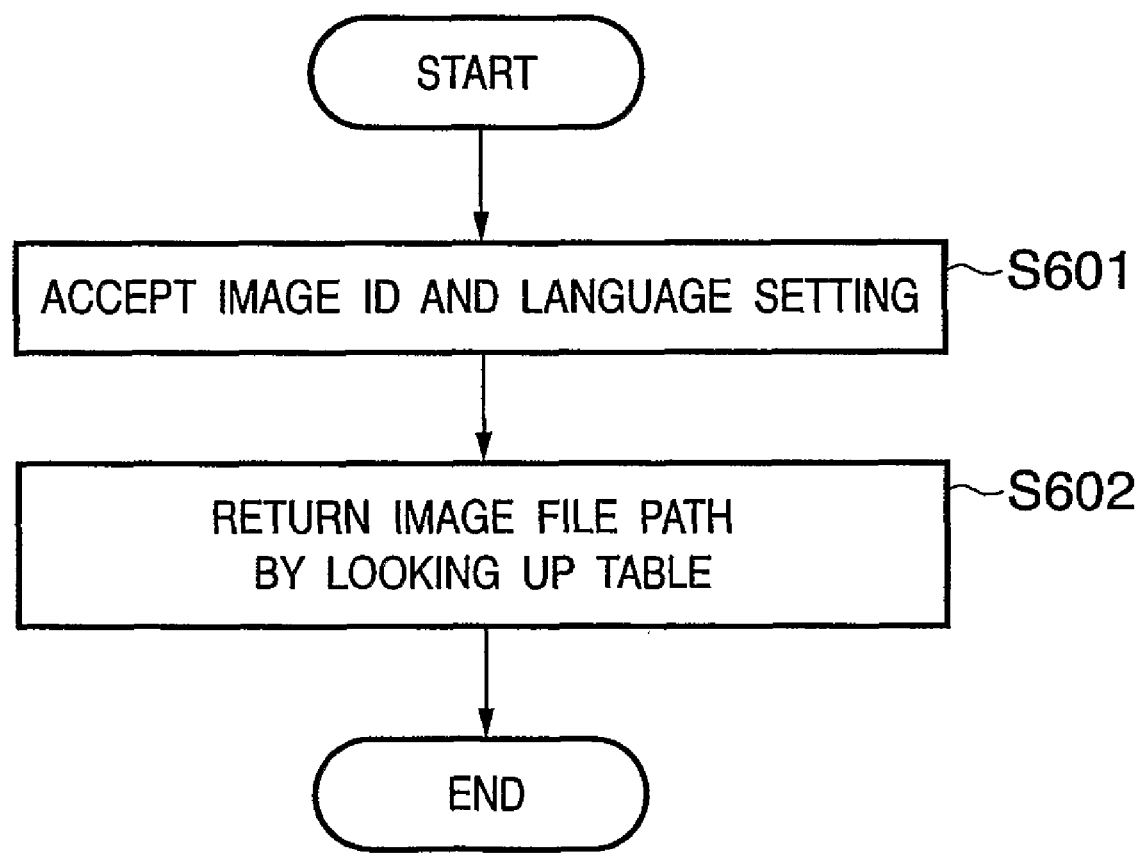
FIG. 6 is a flowchart showing processing performed in response to an image file path request by the main controller included in the facsimile apparatus as the embodiment of the present invention.

On the other hand, if an image file path is requested from the HTTP server of the NIC 1 in S311 of FIG. 3, the main controller 3 performs processing shown in FIG. 6.

First, in step S601, the main controller 3 accepts a path request including a language setting value and image ID from the HTTP server.

The HTTP server receives a language setting value for each page from a certain terminal 7, and issues a path request including the language setting value and an image ID to the main controller 3. Note that the present invention is not limited to this processing, and the following processing may also be performed. When a language is selected on a certain terminal 7 by the processing in T2 of FIG. 2, a language setting value corresponding to the language is held by making the value correspond to the terminal 7. That is, the HTTP server stores a table showing the correspondence of language setting values with terminals. Accordingly, when a display request is issued from the terminal 7 after that, the HTTP server reads out the language setting value corresponding to the terminal 7, designates the language setting value and an image ID, and requests the main controller 3 for the path.

When accepting this request, the main controller 3 selects one of the tables shown in FIG. 4, searches for "a path to the image file" corresponding to the image ID, and returns the path to the HTTP server (S602). For example, if the language setting value is Japanese and the image ID is 1001, an image file path "title_jpn.gif" is obtained from the table 401 shown in FIG. 4. The HTTP server embeds the returned path in the HTML file, and transmits the file to the terminal.

Note that when a display request is issued from the terminal 7, an HTML page to be displayed on the browser of the terminal 7 is basically so formed as to transmit the language setting value to the HTTP server. However, it is also possible to form an HTML page to be displayed on the browser of the terminal 7 so as not to transmit the language setting value from the terminal 7 to the HTTP server, and to request the main controller 3 for image data by using the language setting value set and registered by the display controller 4b. Note also that when a table showing the correspondence of language setting values with terminals is stored in the HTTP server and a language setting value corresponding to the terminal 7 is read out from the table, if the HTTP server does not store any language setting value corresponding to the terminal 7, it is also possible to request the main controller 3 for image data by using the language setting value set and registered by the display controller 4b.

Figure 7:
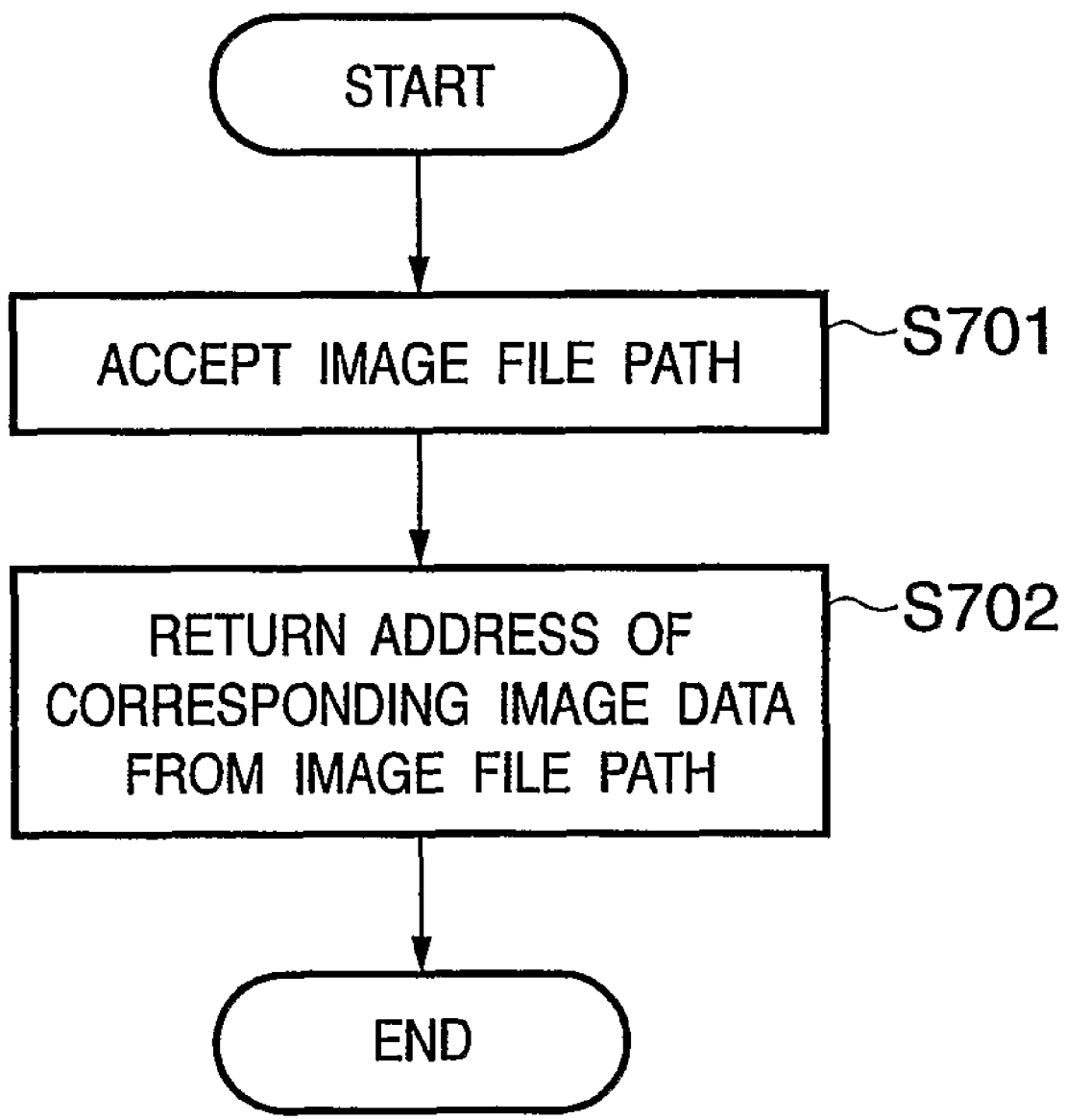
FIG. 7 is a flowchart showing processing performed in response to an image data request by the main controller included in the facsimile apparatus as the embodiment of the present invention.

FIG. 7 is a flowchart showing processing which the main controller 3 performs when an image data address is requested by designating an image file path (U4).

As explained in FIG. 2, if a path to an image file is embedded in the analyzed HTML file, the browser of the terminal 7 attempts to acquire the image data by tracing the path. If an image file name alone is described as this path (if no directory is designated), an HTTP server storing the HTML file currently being analyzed is requested for image data corresponding to the image file name. In this embodiment, only an image file name is stored as a path to an image file in the table shown in FIG. 4, so the image file path called by the SHTML file and embedded in the HTML file contains only an image file name. Therefore, the terminal 7 requests image data by designating an image file name (L3), and the HTTP server requests the main controller 3 for the image data by designating the image file name (U4).

In response to this request, the main controller 3 accepts the image file name in step S701, advances to step S702 to search the tables shown in FIG. 4 for the image file name, and returns a physical address corresponding to the hit image file name to the HTTP server. The HTTP server accesses the memory on the basis of the returned address, and reads out the desired image data.

As described above, the facsimile apparatus 8 as an embodiment of the image processing apparatus according to the present invention has the network interface, and also has the display unit 4c as a display means for displaying an image as a user interface, the main controller 3 including a memory as a storage means for storing image data, the display controller 4b as a generating means for generating an image to be displayed on the display means, by using the image data stored in the memory, and the HTTP server as a transmitting means for transmitting the image data stored in the memory, in response to a browsing request input via the network interface. Since one image data stored in the storage means is displayed on the display unit of the apparatus and is also used to transmit browsing image data across the network, it is possible to prevent repetitive storage of image data, and realize efficient use of the storage area of the memory.

Also, in the facsimile apparatus 8 described above, the memory stores image IDs as a plurality of identifiers for identifying the contents of images, and image data in a plurality of languages corresponding to each image ID. The HTTP server as a transmitting means stores an SHTML file as template display data in which an image ID is embedded. The HTTP server reads out, from the memory, image data which corresponds to the image ID contained in the SHTML file and is expressed in a predetermined language, and transmits the readout image data.

This allows one SHTML file to correspond to a plurality of languages. That is, it is no longer necessary to store an HTML file for each of a plurality of languages, so the storage area of the memory can be used more efficiently.

Furthermore, the HTTP server as a transmitting means stores a language setting corresponding to a terminal 7 having transmitted a browsing request. When accepting a browsing request, the HTTP server specifies the terminal 7 as the transmission source, reads out the language setting corresponding to the terminal 7, reads out image data corresponding to the readout language setting from the memory of the main controller 3, and transmits the readout image data to the terminal 7. When the correspondence of terminals with language settings is stored as described above, the user of a terminal need not designate the language of display data whenever accessing the facsimile apparatus 8, so the load on the user can be reduced.

Other Embodiments

Though the embodiment of the present invention has been detailed above, the invention may be applied to a system constituted by a plurality of devices, or an apparatus comprising a single device.

Further, the invention can be implemented by supplying a software program, which implements the functions of the foregoing embodiments, directly or remotely to a system or apparatus, reading the supplied program code with a computer of the system or apparatus, and then executing the program code. Accordingly, since the functions of the present invention are implemented by computer, the program code installed in the computer is also included within a technical scope of the present invention.

In this case, so long as the system or apparatus has the functions of the program, the program may be executed in any form, such as an object code, a program executed by an interpreter, or scrip data supplied to an operating system.

Examples of storage media that can be used for supplying the program are a floppy disk, a hard disk, an optical disk, a magneto-optical disk, an MO, a CD-ROM, a CD-R, a CD-RW, a magnetic tape, a non-volatile type memory card, a ROM, and a DVD (DVD-ROM and DVD-R).

As for the method of supplying the program, a client computer can be connected to a home page on the Internet using a browser of the client computer, and the computer program of the present invention or an automatically-installable compressed file of the program can be downloaded from the home page to a recording medium such as a hard disk. Further, the program of the present invention can be supplied by dividing the program code constituting the program into a plurality of files and downloading the files from different home pages. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a home page via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing according to the instructions of the program, so that the functions of the foregoing embodiments can be implemented by this processing.

Further, after the program read from the storage medium is written to a function expansion board inserted into the computer or to a memory provided in a function expansion unit connected to the computer, a CPU or the like mounted on the function expansion board or function expansion unit performs all or a part of the actual processing according to the instructions of the program, so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-205062 filed on Jul. 12, 2004, the entire contents of which are hereby incorporated by reference herein.

The invention claimed is:

1. An image processing apparatus having a network interface, comprising:
   display means for displaying an image as a user interface;
   storage means for storing image data;
   generating means for generating display data to be displayed on said display means, by using the image data stored in said storage means;
   transmitting means for transmitting the image data stored in said storage means to a terminal, in response to a browsing request input from the terminal via said network interface; and
   path management means for storing paths, each path describing a physical address of image data stored in said storage means, so that the image data stored in said storage means can be read with use of the path without using a file name managed by a file system,
   wherein a same image is read out from said storage means by said generating means using the physical address of the image data and by said transmitting means using the path describing the physical address of the image data.

2. An image processing apparatus according to claim 1, wherein
   said storage means stores a plurality of image identifiers for identifying contents of images, and image data in a plurality of languages corresponding to each image identifier, and
   said transmitting means stores template display data in which the image identifier is embedded, reads out, from said storage means, image data corresponding to the image identifier of the template display data and expressed in a predetermined language, and transmits the readout image data.

3. An image processing apparatus according to claim 2, wherein said transmitting means stores a language setting corresponding to the terminal having transmitted the browsing request, specifies the terminal as a transmission source of the browsing request, reads out a language setting corresponding to the terminal, reads out image data corresponding to the readout language setting from said storage means, and transmits the readout image data to the terminal.

4. An image processing apparatus according to claim 3, wherein when accepting designation of a language setting from the terminal as a transmission source of the browsing request, said transmitting means stores the terminal and language setting by making the terminal and language setting correspond to each other.

5. An image processing apparatus according to claim 4, wherein
said generating means has a language setting which sets a language for use in an image to be displayed on said display means, and
if accepting no designation of a language setting from the terminal as a transmission source of the browsing request, said transmitting means reads out, from said storage means, image data in a language corresponding to the language setting set in said generating means, and transmits the readout image data to the terminal.

6. An image processing apparatus according to claim 1, wherein
said storage means further stores a plurality of image identifiers for identifying contents of images, and a path to image data corresponding to each image identifier, and
said transmitting means stores template display data in which the image identifier is embedded, reads out, from said storage means, a path to image data corresponding to the image identifier of the template display data, embeds the path in display data described in a markup language, and transmits the display data.

7. An image processing apparatus according to claim 1, wherein
said storage means further stores a plurality of image identifiers for identifying contents of images, a path to image data corresponding to each image identifier, and the physical address of image data, and
said transmitting means stores template display data in which the image identifier is embedded, reads out, from said storage means, a path to image data corresponding to the image identifier of the template display data, embeds the path in display data described in a markup language, and transmits the display data to the terminal, and, if the terminal requests image data specifying the path, reads out image data from the physical address corresponding to the path by referring to said storage means, and transmits the image data to the terminal.

8. A control method of an image processing apparatus including a network interface, storage means for storing image data, display means for displaying an image, and path management means for storing paths, each path describing a physical address of image data stored in said storage means, so that the image data stored in said storage means can be read with use of the path without using a file name managed by a file system, the method comprising:
a generation step of generating display data to be displayed on said display means, by using the image data stored in the storage means;
a display step of displaying, on the display means, the image generated in the generation step as a user interface;
an input step of inputting an image browsing request from a terminal via the network interface; and
a transmission step of transmitting the image data stored in the storage means to the terminal, in response to the image browsing request input in the input step,
wherein a same image is read out from said storage means using the physical address of the image data at the generation step and using the path describing the physical address of image data at the transmission step.

9. A non-transitory computer-readable storage medium on which is stored a control program of an image processing apparatus including a network interface, storage means for storing image data, display means for displaying an image, and path management means for storing paths, each path describing a physical address of image data stored in said storage means, so that the image data stored in said storage means can be read with use of the path without using a file name managed by a file system, wherein the control program causes the image processing apparatus to execute:
a generation step of generating display data to be displayed on said display means, by using the image data stored in the storage means;
a display step of displaying, on the display means, the image generated in the generation step as a user interface;
an input step of inputting an image browsing request from a terminal via the network interface; and
a transmission step of transmitting the image data stored in the storage means to the terminal, in response to the image browsing request input in the input step,
wherein a same image is read out from said storage means using the physical address of the image data at the generation step and using the path describing the physical address of the image data at the transmission step.

* * * * *